US012580385B2

(12) United States Patent
Dölle et al.

(10) Patent No.: US 12,580,385 B2
(45) Date of Patent: Mar. 17, 2026

(54) METHODS AND SYSTEMS FOR CONTROLLING AN ENERGY EXCHANGE

(71) Applicant: Siemens Aktiengesellschaft, Munich (DE)

(72) Inventors: Oliver Dölle, Erlangen (DE); Sebastian Schreck, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 319 days.

(21) Appl. No.: 17/635,544

(22) PCT Filed: Apr. 28, 2020

(86) PCT No.: PCT/EP2020/061685
§ 371 (c)(1),
(2) Date: Feb. 15, 2022

(87) PCT Pub. No.: WO2021/032326
PCT Pub. Date: Feb. 25, 2021

(65) Prior Publication Data
US 2022/0337059 A1     Oct. 20, 2022

(30) Foreign Application Priority Data
Aug. 16, 2019    (DE) ..................... 10 2019 212 291.4

(51) Int. Cl.
*H02J 3/00*          (2006.01)
*H02J 3/32*          (2006.01)
*H02J 3/38*          (2006.01)

(52) U.S. Cl.
CPC .............. *H02J 3/003* (2020.01); *H02J 3/004* (2020.01); *H02J 3/32* (2013.01); *H02J 3/381* (2013.01); *H02J 2300/24* (2020.01)

(58) Field of Classification Search
None
See application file for complete search history.

(56) References Cited

U.S. PATENT DOCUMENTS

| | | | |
|---|---|---|---|
| 2004/0133529 A1 | 7/2004 | Furka | 705/401 |
| 2012/0166004 A1 | 6/2012 | Park et al. | 700/291 |

(Continued)

FOREIGN PATENT DOCUMENTS

| | | | |
|---|---|---|---|
| DE | 102010040032 A1 | 3/2012 | D06F 35/00 |
| GB | 2 514 128 | 11/2014 | F24D 19/10 |

(Continued)

OTHER PUBLICATIONS

Search Report for International Application No. PCT/EP2020/061685, 11 pages, Jul. 16, 2020.

(Continued)

*Primary Examiner* — Ryan A Jarrett
(74) *Attorney, Agent, or Firm* — Slayden Grubert Beard PLLC

(57)          ABSTRACT

Various embodiments include a method for controlling an energy exchange among a plurality of energy systems using a control center, wherein a component of one of the plurality of energy systems is coupled to the control center via an interface module for data exchange. The method includes: transmitting a first data set to the interface module with a prediction profile regarding an energy exchange of the component; transmitting a second data set to the control center using the interface module including the first data set and component-specific data of the component; determining control data using the control center using the prediction profile and the component-specific data and data communicated to the control center by further energy systems to determine the control data; transmitting the determined (Continued)

control data to the interface module; and operating the component based on the control data.

8 Claims, 1 Drawing Sheet

(56)                        References Cited

U.S. PATENT DOCUMENTS

| | | | |
|---|---|---|---|
| 2013/0135116 A1 | 5/2013 | Garbe et al. ............. | 340/870.02 |
| 2019/0036340 A1 | 1/2019 | Meeker .................. | H02J 3/382 |

FOREIGN PATENT DOCUMENTS

| | | | | |
|---|---|---|---|---|
| WO | 2016/138885 A1 | 9/2016 | ............. | G06Q 10/04 |
| WO | 2021/032326 A1 | 2/2021 | ................ | H02J 3/00 |

OTHER PUBLICATIONS

Deng, S. et al., "How to Evaluate Performance of Net Zero Energy Building—A Literature Research," Energy 71, 16 pages, Jun. 2, 2014.

Klein, Konstantin et al., "Load Shifting Using the Heating and Cooling System of an Office Building: Quantitative Potential Evaluation for Different Flexibility and Storage Options," Applied Energy 203, pp. 917-937, Jul. 7, 2017.

Australian Office Action, Application No. 2020333139, 5 pages, Oct. 4, 2023.

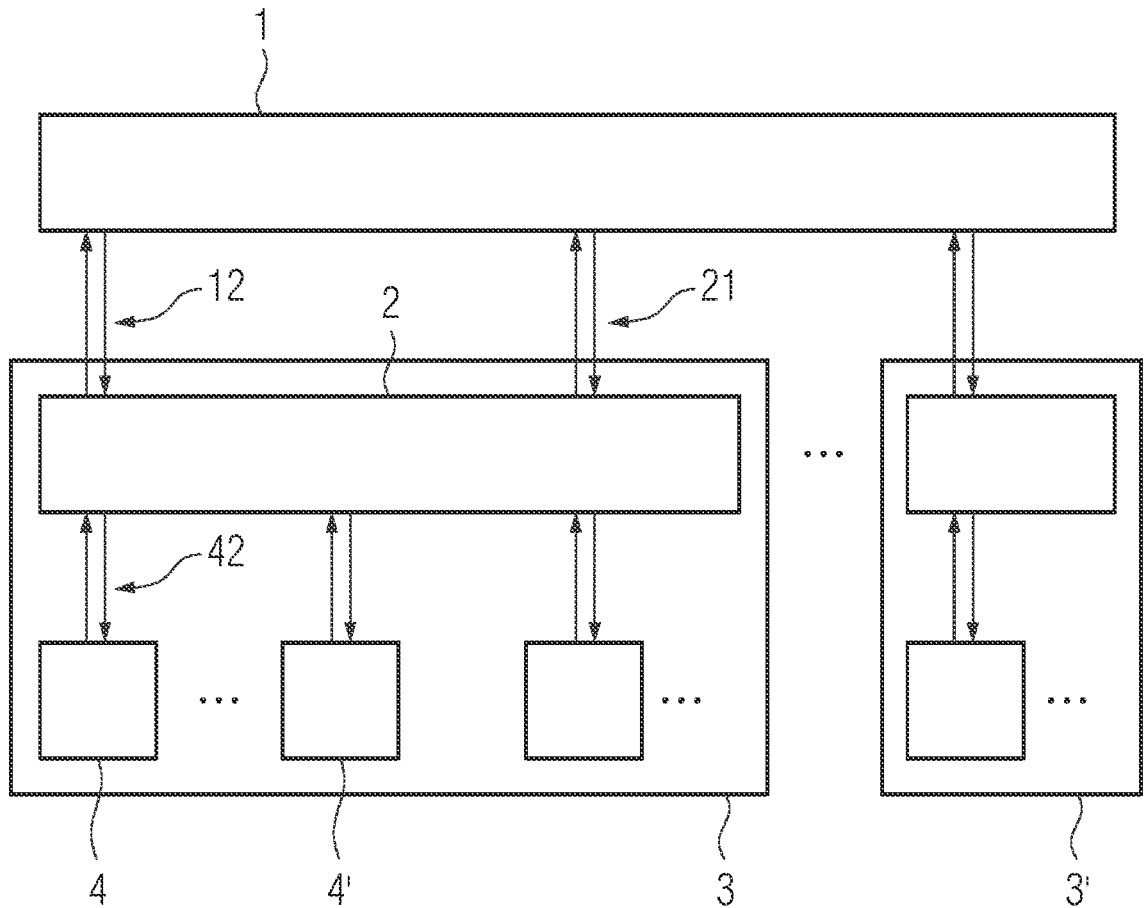

METHODS AND SYSTEMS FOR CONTROLLING AN ENERGY EXCHANGE

CROSS-REFERENCE TO RELATED APPLICATIONS

This application is a U.S. National Stage Application of International Application No. PCT/EP2020/061685 filed Apr. 28, 2020, which designates the United States of America, and claims priority to DE Application No. 10 2019 212 291.4 filed Aug. 16, 2019, the contents of which are hereby incorporated by reference in their entirety.

TECHNICAL FIELD

The present disclosure relates to energy exchanges. Various embodiments include methods and/or systems for controlling an energy exchange between a plurality of energy systems by means of a control center.

BACKGROUND

By means of an energy market platform, which can likewise be referred to as a local energy market, energy systems (referred to as: prosumers) can exchange energy among one another in a decentralized manner. Electrical energy, that is to say electricity, is typically exchanged. The energy systems or the prosumers or the participants in the local energy market in this case submit offers, which are matched in the best possible way by means of the energy market platform (referred to as: market matching). On the basis of this the energy exchange between the energy systems is controlled by means of the energy market platform.

In other words, the local energy market is realized by an energy market platform which is central in relation to the energy systems and which controls, coordinates and/or manages the energy exchange between the energy systems. The local energy market is thus technically realized by such an energy market platform. In this case, an energy system is for example a district of a town/city, a municipality, a building, a residential building, in particular a single-family dwelling or a multi-family dwelling, an industrial installation, an amalgamation of a plurality of buildings and/or further technical installations comprising energy-technological installations, in particular in regard to energy consumption, energy generation and/or energy storage. In recent years in particular, there has been an increase in the number of residential buildings with self-generated energy, for example by means of a photovoltaic installation, and storage, for example by means of a battery storage unit. Such a residential building is an energy system which generates, consumes and possibly stores electrical energy.

For an energy system to participate in a local energy market, a prediction (forecast) of the energy consumption and/or of the energy generation for the respective energy system and for a specific temporal prediction horizon is advantageous. Such a prediction can be determined with sufficient accuracy for relatively large energy systems, for example housing developments. For relatively small energy systems, for example individual households, a sufficiently accurate prediction is possible only with difficultly on account of relatively large stochastic fluctuations, for example as a result of switching on and/or switching off of individual devices. In other words, the consumption profile of a household is dominated by stochastic fluctuations. This results in two fundamental problems in particular for the participation of relatively small energy systems in a local energy market, in particular for single-family dwellings or individual households.

Firstly, on account of an inaccurate or incorrect prediction, for example in regard to the energy generation by means of a photovoltaic installation, the affected energy system might provide the energy market with a lower amount of energy than was notified or communicated to the energy market beforehand by the energy system. As a result, the energy difference has to be compensated for by the further energy systems of the local energy market and/or procured from an energy network that is superordinate in relation to the local energy market.

Secondly, on account of an inaccurate prediction, one of the energy systems might consume less energy than was communicated to the energy market beforehand by said energy system. As a result, an excessively large amount of energy would be provided by the further energy systems participating in the local energy market.

One possible solution to the two problems mentioned is planning of energy reserves. By way of example, only 75 percent of a forecast amount of energy generated by means of a photovoltaic installation might be reported to the local energy market for distribution to the further energy systems. As a result of this, however, the potential of the local energy market would not be fully utilized and, moreover, additional costs for the participants might arise which might make participation in a local energy market appear less attractive.

SUMMARY

The teachings of the present disclosure include systems and/or methods which may be used for improving the energy exchange within a local energy market. For example, some embodiments of the teachings herein include a method for controlling an energy exchange between a plurality of energy systems (3, 3') by means of a control center (1), wherein at least one component (4) of one of the energy systems (3) is coupled to the control center (1) via an interface module (2) for the purpose of data exchange and is operable in accordance with control data, comprising the following steps: transmitting a first data set to the interface module (2) by means of the component (4), wherein the first data set comprises at least one prediction profile regarding an energy exchange of the component (4); transmitting a second data set to the control center (1) by means of the interface module (2), wherein the second data set comprises at least the first data set and component-specific data of the component (4); determining control data by means of the control center (1), wherein at least the prediction profile communicated by means of the second data set and the component-specific data and also data communicated to the control center (1) by further energy systems (3') are taken into account here; transmitting the determined control data to the interface module (2); and operating, by means of the interface module (2), the component (4) in accordance with the control data communicated to the interface module (2).

In some embodiments, the prediction profile is provided by the component (4) and/or determined by the component (4).

In some embodiments, the energy system (3) comprising the component (4) comprises the interface module (2).

In some embodiments, a consumption profile regarding an energy consumption, a generation profile regarding an energy generation and/or a storage profile regarding an energy storage are/is used as prediction profile.

In some embodiments, the control data are determined continuously over time.

In some embodiments, the control data are determined by means of solving an optimization problem.

In some embodiments, the component (4) comprises a prediction module, wherein the prediction profile is provided and/or determined by the prediction module, and the first data set comprising the prediction profile is transmitted to the interface module (2) by the prediction module.

In some embodiments, the prediction module determines the prediction profile, wherein the prediction profile is determined on the basis of measurements, a use profile, on weather data and/or on historical data.

In some embodiments, a battery storage unit, a photovoltaic installation, a charging station for electric vehicles, a heat pump, a heating element, a washing machine, a dryer, a washer dryer, an oven, a stove and/or a coffee machine are/is operated by means of the interface module (2) in accordance with the communicated control data.

As another example, some embodiments include an energy market platform, comprising a control center (1) for controlling an energy exchange between a plurality of energy systems (3, 3'), wherein the energy systems (3, 3') are at least partly coupled among one another for the energy exchange by means of an energy network specific to the energy to be exchanged, characterized in that the control center (1) and the energy systems (3, 3') are configured for carrying out a method as described herein.

BRIEF DESCRIPTION OF THE DRAWINGS

Further advantages, features, and details of the teachings herein are evident from the exemplary embodiments described below and with reference to the drawing. In this case, the sole FIGURE schematically shows a local energy market with a control center for controlling an energy exchange between a plurality of energy systems incorporating teachings of the present disclosure. Elements that are of the same type, are equivalent or act identically may be provided with the same reference signs in the FIGURE.

The FIGURE shows a local energy market with a control center 1.

DETAILED DESCRIPTION

Example methods for controlling an energy exchange between a plurality of energy systems by means of a control center, wherein at least one component of one of the energy systems is coupled to the control center via an interface module for the purpose of data exchange and is operable in accordance with control data, comprise: transmitting a first data set to the interface module by means of the component, wherein the first data set comprises at least one prediction profile regarding an energy exchange of the component; transmitting a second data set to the control center by means of the interface module, wherein the second data set comprises at least the first data set and component-specific data of the component; determining control data by means of the control center, wherein at least the prediction profile communicated by means of the second data set and the component-specific data and also data communicated to the control center by further energy systems are taken into account here; transmitting the determined control data to the interface module; and and operating, by means of the interface module, the component in accordance with the control data communicated to the interface module.

The term "controlling" in the present case encompasses open-loop and likewise closed-loop control. The methods taught herein or one or more steps of the methods can be computer-aided. Configurations of the method can likewise be computer-aided.

A power within a time range results in a specific energy in this time range which is provided, is generated, is consumed, is stored and/or is exchanged. In this sense the terms energy and power are equivalent in the present disclosure and are thus mutually interchangeable.

The control center can be a coordination platform (energy market platform) which is central in relation to the energy systems, in particular a central server. In this case, the control center is central in relation to controlling the energy exchange, that is to say that it need not be present in a locally centralized manner. For example, the control center is spatially distributed in one or more computing centers (referred to as: distributed computing). In other words, the control center is a control unit configured for jointly controlling the energy exchange between the energy systems.

The energy systems typically comprise energy-technological installations, for example generation installations, consumption installations and/or storage installations for one or more forms of energy. The energy systems are at least partly coupled to one another typically via an energy network which is specific in relation to the energy exchange, typically at least via an electricity grid.

The control center can furthermore communicate and exchange data or data sets with the energy systems via a data network, in particular via the Internet. In this case, the control center need not necessarily be situated in the region covered by the energy system or be part of the energy system. In some embodiments, the control center is part of a local energy market platform. The local energy market platform controls or coordinates the energy exchange between the energy systems. In some embodiments, the control center can form a local energy market.

In some embodiments, the prediction profile relates to the component itself. A prediction broken down applicably to the components is thus made regarding which component is actually provided for the generation, for the consumption and/or for the storage of the energy to be exchanged. As a result, the prediction or the prediction profile is improved with regard to its accuracy. In particular, stochastic switch-on processes are represented in an improved manner by means of the prediction profile.

The component, for example a coffee machine, communicates the prediction profile regarding the energy exchange, that is to say regarding the energy which the component generates, consumes and/or stores within a future time range, to the interface module (referred to as: gateway). This is effected by means of the first data set. In other words, the first data set comprises the prediction profile or the information about the prediction profile.

Furthermore, component-specific information about the component is stored in the interface module. This component-specific information, present as data, can be a power, an efficiency, a coefficient of performance, carbon dioxide emission, a maximum price for procuring energy, a minimum price for generating and/or storing an energy, and/or further information, which a user of the component has stored, for example.

The component-specific information is communicated to the control center together with the prediction profile communicated to the interface module by the component. This is effected by means of the second data set, wherein the second data set can be composed of two data sets. In some embodiments, the second data set comprises the component-specific data/information and the prediction profile as information.

In this case, the interface module can form an interface to the control center, which interface is central in relation to the energy system. In other words, respective component-specific data or information can be stored within the interface module for a plurality of components of the energy system, and each of the components communicates a respective prediction profile to the interface module. The component-specific data and the prediction profiles are then communicated to the control center by the interface module in a centralized manner in this sense. In some embodiments, as a result, it is not necessary for each individual component of the energy system to be linked individually to the control center regarding the data exchange. Moreover, the component-specific data or information and/or the prediction profiles can be stored at least once in the interface module.

The control center, on the basis of the prediction profile communicated to it and on the basis of the component-specific data communicated to it, determines the control data for the component. In this case, the control data relate to the operation of the component, that is to say for example to a start time and end time of the operation of the component and/or to clearance for the operation of the component and/or to an amount of energy provided for the operation of the component or power which the component generates, consumes and/or stores and/or utilizes in some other way. In this case, the control center likewise takes account of the data communicated to the control center by the further energy systems, for example regarding energy generation, energy consumption and/or energy storage of the respective further energy systems. The control center thereby controls and/or coordinates the energy exchange between the energy systems. Furthermore, it is thereby possible to realize a local energy market, wherein a local energy market platform incorporating the teachings herein comprises the control center.

In some embodiments, the determined control data are communicated to the interface module of the energy system which comprises the component, for example by means of a third data set. Afterward, the component is operated by means of the interface module in accordance with the control data communicated to the interface module. In other words, the interface module confers on the component clearance regarding the generation of a specific amount of energy, regarding the consumption of a specific amount of energy and/or regarding the storage of a specific amount of energy and/or regarding the point in time or time period of the energy generation, the energy consumption and/or the energy storage by the component. The aforementioned amounts of energy or powers are typically likewise determined by the control center.

In some embodiments, load management is made possible. By way of example, information about the consumption of the component can be provided to a user of the component and/or of the energy system. As a result, the energy consumption becomes optimizable, for example by the user, such that the loading on the energy network and/or a superordinate energy network can be relieved. Furthermore, the energy network is stabilized as a result. An additional closed-loop control by way of the frequency of the energy network can be provided, however.

In some embodiments, a local energy market which has a real-time capability and which is likewise operable in times when at a national level network bottlenecks are present and island networks (referred to as: microgrids) form. This analogously applies to genuine island networks.

In some embodiments, the energy market platform comprises a control center for controlling an energy exchange between a plurality of energy systems, wherein the energy systems are at least partly coupled among one another for the energy exchange by means of an energy network, in particular an electricity grid, specific to the energy to be exchanged. The energy market platform is characterized in that the control center and the energy systems are configured for carrying out a method as described herein and/or one of the configurations thereof.

The energy market platform thus forms a local energy market. In this case, the energy exchange between the participating energy systems is controlled and/or coordinated by the control center and/or one of the configurations thereof. In particular, the energy market platform in conjunction with the energy systems forms a decentralized energy system. Advantages and configurations arise which are of the same type and are equivalent to those in respect of the methods described herein.

In some embodiments, the prediction profile is provided by the component and/or determined by the component. In other words, the component may be configured to provide the prediction profile, for example by means of the manufacturer of the component, and/or to determine the prediction profile, for example on the basis of measurements. As a result, the prediction profile is determined as near as possible to the generation, consumption and/or storage of the energy, namely by means of the component which actually generates, consumes and/or stores the energy. In particular, the accuracy of the prediction profile is improved as a result.

In some embodiments, the prediction profile can be determined and/or provided by a smart infrastructure of the energy system. In this regard, by way of example, monitoring of one or more sockets to which the component is connected is conceivable. As a result, the prediction profile is provided and/or determined by the smart infrastructure of the energy system (referred to as: smart home), for example KNX.

In some embodiments, the energy system comprising the component comprises the interface module. In other words, the energy system has an interface (gateway) to the control center, which interface is centralized in relation to the components. It is thereby possible to bidirectionally exchange data/information between the interface module and the control center, in particular the prediction profiles, the component-specific data, the determined control data and/or further data/information. In some embodiments, a consumption profile regarding an energy consumption, a generation profile regarding an energy generation and/or a storage profile regarding an energy storage are/is used as prediction profile. It is thereby possible to take account of any load regarding the component.

In some embodiments, the control data are determined continuously over time. This may improve the control of the energy exchange. In some embodiments, provision can be made for the control data to be determined discretely, periodically or regularly.

In some embodiments, the control data are determined by solving an optimization problem. In principle, there is a need for control and/or coordination of the energy exchange between the energy systems. That is the case in particular since the exchange is intended to be effected as efficiently as possible in relation to a variable to be optimized. The variable to be optimized is referred to as target function in the context of optimization problems.

In other words, the energy exchange is intended to be controlled in such a way that it is as optimum as possible in relation to the target function. For this purpose, the target function is optimized, that is to say minimized or maximized as much as possible. In other words, for this purpose the control center is used, which carries out an optimization, that is to say solves an optimization problem. The target function can characterize or model the emissions of the energy systems, for example carbon dioxide emissions, or operating costs of the energy systems.

The optimization thus ensures that the energy consumption is covered by means of corresponding energy generation as optimally as possible, that is to say for example by means of the lowest possible carbon dioxide emission or total carbon dioxide emission of the energy systems. In this case, the actual optimization, that is to say the solving of the optimization problem, is effected by means of numerical methods (optimization methods) on account of the high complexity of the problem. The solution to the optimization problem is then taken as a basis, at least in a time range, for the control data and thus for a control of the component of the energy system, or of the components of the energy systems, that is as optimal as possible.

In some embodiments, the component comprises a prediction module, wherein the prediction profile is provided and/or determined by the prediction module, and the first data set comprising the prediction profile is transmitted to the interface module by the prediction module. The accuracy of the prediction profile can be improved as a result. In particular, recourse to permanently and/or previously stored prediction profiles, for example from the manufacturer of the component, is not necessary, rather the component itself can determine the prediction profile by means of the prediction module. In this regard, the component thus forms an intelligent (referred to as: smart) unit.

In some embodiments, the prediction module determines the prediction profile, wherein the prediction profile is determined on the basis of measurements, a use profile or user profile, on weather data and/or on historical data. The accuracy of the prediction profile can be further improved as a result.

In some embodiments, a battery storage unit, a photovoltaic installation, a charging station for electric vehicles, a heat pump, a heating element, a washing machine, a dryer, a washer dryer, an oven, a stove and/or a coffee machine are/is operated by means of the interface module in accordance with the communicated control data.

In some embodiments, a plurality of components of the energy system, in particular all the components of the energy system, are operated in accordance with the present invention and/or one of the configurations thereof. The above-mentioned components are advantageous particularly for private households, for example one-family dwellings or multi-family dwellings, or apartment buildings.

The FIGURE shows a local energy market with a control center 1. The control center 1 is provided or configured for controlling or coordinating energy exchanges between a plurality of energy systems 3, 3'. The energy systems 3, 3' are coupled to one another via an energy network, in particular an electricity grid, which makes the energy exchange possible. Furthermore, the energy systems 3, 3' can in principle exchange data or information with the control center 1, for example via one or more data connections, in particular via the Internet. The FIGURE essentially illustrates three data exchanges 12, 21, 42.

Each of the energy systems 3, 3' communicates as necessary an offer for generation, consumption and/or storage of a specific amount of energy to the control center 1. On the basis of these communicated data, the control center 1 subsequently matches the generation, consumption and/or storage of all the energy systems 3, 3' in the best possible way, wherein further boundary conditions and requirements can be taken into account. In particular, asking prices can be taken into account.

At least one of the energy systems 3, 3' comprises an interface module 2. The energy system 3 comprises the interface module 2 provided for data exchange with the control center 1. The further energy systems are identified in combination by the reference sign 3'.

The energy system 3 has a plurality of components 4, 4', the further components being identified in combination by the reference sign 4'. The components 4, 4' are coupled to the interface module 2 for data exchange. The interface module 2 thus forms a centralized data interface to the control center 1 in relation to the components and their data exchange.

Firstly, component-specific data regarding the component 4 are stored within the interface module 2. For example physical and/or operational boundary conditions and/or a maximum price for energy consumption and/or a minimum price for energy generation.

The component 4 is configured to provide and/or to determine a prediction profile for a future or expected energy exchange, that is to say for future or expected energy generation by the component 4, for future or expected energy consumption by the component 4 and/or for future or expected energy storage by the component 4. For this purpose, the component 4 can have a prediction module.

The prediction profile is transmitted to the interface module 2 by the component 4 (data exchange 42). In other words, the interface module 2 comprises the prediction profile of the component 4 and the component-specific data as information.

If the intention is for the component 4 to be operated, for example if a user of the energy system 3 would like to switch on his/her coffee machine, then the prediction profile together with the component-specific data as second data set is transmitted to the control center 1 by means of the interface module 2 (data exchange 12). In other words, the prediction profile and the component-specific data are now stored in the control center 1. The further energy systems 3' likewise communicate corresponding data for consumption, generation and/or storage of energy, in particular electrical energy, to the control center 1.

By means of a numerical optimization, the control center 1 continuously matches (referred to as: market matching) the different items of information/offers for generation, consumption and storage in the best possible way. By way of example, if for energy consumption there is available such matching with energy generation, for example by means of another of the energy systems 3', then this result is communicated in the form of control data to the interface module 2 (data exchange 21). Afterward, on the basis of the result or the control data, the interface module 2 gives clearance for the operation of the component 4. In other words, the component 4 is operated according to the control data determined and communicated. As a result, the energy exchange between the energy systems 3, 3' is likewise controlled.

In some embodiments, the corresponding data exchanges 12, 21, 42 have a low latency. In particular, latencies in the range of 0 seconds to 2 seconds, in particular in the range of 0.5 seconds to 1 second may be used. The control center 1 and the interface module 2 are configured or embodied accordingly.

In some embodiments, the consumption profile can be effected by means of an aggregated measurement at the network connection point. As a result, complex and expensive measuring devices for the component 4 and for the further components 4' are not necessary. However, they can be provided supplementarily.

In some embodiments, the interface module 2 and/or the component have/has a user interface which enables a user of the component 4 and/or of the energy system 3 to prevent the switch-on process of the component 4 and thus the operation thereof. This may be advantageous if there is not enough energy available, for example within the local energy market. Furthermore, a user of the component 4 and/or of the energy system 3 could notify the control center 1, by means of the user interface, that the component 4 is intended to be operated in any case. This can be effected by means of reserve capacities, for which the user should make a higher payment, if appropriate.

In some embodiments, each of the components 4, 4' of the energy system 3 if the prediction profile is communicated or transmitted to the control center 1 as early as possible before operation of the respective component 4, 4'. As a result, as many prediction profiles, in particular consumption profiles, as possible can be taken into account. By means of a fish-eye, a photovoltaic installation could determine sufficiently good short-term predictions, for example for the next 5 to 10 minutes (prediction horizon). In conjunction with weather forecasts or weather data and an evaluation of historical data in this regard, a neural network could likewise determine and/or provide longer-term predictions with a longer prediction horizon. In the best case the prediction profile or prediction profiles of the components 4, 4' of the energy system 3 with a longer prediction horizon is or are communicated to the control center 1 by means of the interface module 2 since the control of the energy exchanges between the energy systems 3, 3' is improved as a result.

In some embodiments, the interface module 2 can be configured in such a way that firstly within the energy system 3 (energy-system-internally), energy-system-internal generation is matched as much as possible with energy-system-internal consumption. In other words, the interface module 2 comprises the control center 1 and/or a further control center configured correspondingly.

Although the teachings herein have been more specifically illustrated and described in detail by means of the exemplary embodiments, nevertheless the scope of the disclosure is not restricted by the examples disclosed or other variations can be derived therefrom by the person skilled in the art, without departing from the scope of protection.

LIST OF REFERENCE SIGNS

1 Control center
2 Interface module
3, 3' Energy system
4, 4' Component
12 Data exchange
21 Data exchange
42 Data exchange

What is claimed is:

1. A method for controlling an energy exchange among a plurality of energy systems using a control center, wherein a component of one of the plurality of energy systems is coupled to the control center via an interface module for data exchange, the method comprising:

transmitting a first data set to the interface module from the component, wherein the first data set comprises a prediction profile regarding an energy exchange of the component;

transmitting the first data set and a second data set to the control center using the interface module, wherein the second data set comprises component-specific data provided for a range of working conditions of the component stored in the interface module, the component-specific data including at least one datum selected from the group consisting of: a coefficient of performance indicating a ratio of useful heating or cooling provided to amount of work required, carbon dioxide emission, a maximum price for procuring energy, and a minimum price for generating and/or storing energy;

determining control data using the control center, wherein the control center uses the prediction profile and the component-specific data and data communicated to the control center by further energy systems to determine the control data continuously over time;

transmitting the determined control data to the interface module; and operating the component using the interface module based on the control data.

2. The method as claimed in claim 1, wherein the one energy system of the plurality of energy systems comprises the interface module.

3. The method as claimed in claim 1, further comprising using a consumption profile regarding an energy consumption, a generation profile regarding an energy generation, and/or a storage profile regarding an energy storage as the prediction profile.

4. The method as claimed in claim 1, wherein the control data are determined by solving an optimization problem.

5. The method as claimed in claim 1, wherein:

the component comprises a prediction module;

the prediction profile is provided and/or determined by the prediction module; and the first data set is transmitted to the interface module by the prediction module.

6. The method as claimed in claim 5, wherein:

the prediction module determines the prediction profile; and the prediction profile is determined on the basis of measurements, a use profile, on weather data, and/or on historical data.

7. The method as claimed in claim 1, wherein the control data is used to operate at least one device selected from the group consisting of: a battery storage unit, a photovoltaic installation, a charging station for electric vehicles, a heat pump, a heating element, a washing machine, a dryer, a washer dryer, an oven, a stove, and a coffee machine.

8. An energy market platform comprising:

a control center for controlling an energy exchange among a plurality of energy systems;

wherein the energy systems of the plurality of energy systems are at least partly coupled to one another for the energy exchange by an energy network specific to the energy to be exchanged;

an interface module associated with one energy system of the plurality of energy systems to receive a first data set from the one energy system, the first data set including a prediction profile regarding an energy exchange of a component of the one energy system;

the interface module transmits a second data set to the control center, wherein the second data set comprises component-specific data provided for a range of working conditions of the component stored in a memory of the interface module, the component-specific data including at least one datum selected from the group consisting of: a coefficient of performance indicating a ratio of useful heating or cooling provided to amount of work required, carbon dioxide emission, a maximum price for procuring energy, and a minimum price for generating and/or storing energy;

the control center determines control data using the prediction profile and the component-specific data and data communicated to the control center by further energy systems to determine the control data continuously over time;

the control center transmits the determined control data to the interface module; and the interface module operates the component based on the control data.

* * * * *